United States Patent
Prakash et al.

(10) Patent No.: US 10,285,045 B2
(45) Date of Patent: May 7, 2019

(54) MONITORING OF EMBEDDED SUBSCRIBER IDENTITY MODULES

(71) Applicant: T-Mobile USA, Inc., Bellevue, WA (US)

(72) Inventors: Sumeet Prakash, Issaquah, WA (US); Hamza Syed, Bothell, WA (US); Benjamin Phan, Renton, WA (US); Nghia Nguyen, Everett, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/695,992

(22) Filed: Sep. 5, 2017

(65) Prior Publication Data

US 2019/0075448 A1   Mar. 7, 2019

(51) Int. Cl.
*H04W 8/20* (2009.01)
*H04M 1/725* (2006.01)
*H04B 1/3816* (2015.01)

(52) U.S. Cl.
CPC .......... *H04W 8/205* (2013.01); *H04B 1/3816* (2013.01); *H04M 1/72561* (2013.01)

(58) Field of Classification Search
CPC ..... H04W 8/205; H04W 12/04; H04W 8/183; H04W 4/50; H04W 4/60; H04W 48/18; H04L 63/0853
See application file for complete search history.

(56) References Cited

U.S. PATENT DOCUMENTS

| | | | |
|---|---|---|---|
| 9,426,731 B1 | 8/2016 | Uy et al. | |
| 2013/0157673 A1* | 6/2013 | Brusilovsky | H04W 4/70 455/450 |
| 2013/0198266 A1* | 8/2013 | Kiley | H04L 67/34 709/203 |
| 2015/0271662 A1 | 9/2015 | Lhamon et al. | |
| 2015/0349825 A1* | 12/2015 | Lee | H04W 8/205 455/558 |
| 2015/0373778 A1* | 12/2015 | Holtmanns | H04W 8/205 455/558 |
| 2016/0014579 A1* | 1/2016 | Kasilya Sudarsan | H04W 4/16 455/417 |
| 2016/0020802 A1 | 1/2016 | Lee et al. | |
| 2017/0013442 A1 | 1/2017 | Li et al. | |
| 2017/0149827 A1* | 5/2017 | Sims | H04L 63/20 |
| 2017/0269918 A1* | 9/2017 | Dumoulin | G06F 8/61 |

FOREIGN PATENT DOCUMENTS

WO    2017052136 A1    3/2017

OTHER PUBLICATIONS

International Search Report and Written Opinion for PCT Application No. PCT/US2018/049416 dated Dec. 27, 2018, 12 pages.

* cited by examiner

*Primary Examiner* — Dong-Chang Shiue
(74) *Attorney, Agent, or Firm* — Han Santos, PLLC (57) ABSTRACT

A system for monitoring embedded subscriber identity modules (eSIMs) is disclosed. The monitoring system provides visibility into the end-to-end performance of a mobile network operator (MNO) profile. The system controls a mobile device that is provisioned with a MNO profile and communicates with a subscription manager (SM) that produces and delivers the MNO profile. This system enables the monitoring of the interactions between the subscription manager and the eSIM and monitors the data preparation (SM-DP) and the secure routing (SM-SR) functionalities in the subscription manager.

19 Claims, 6 Drawing Sheets

MONITORING OF EMBEDDED SUBSCRIBER IDENTITY MODULES

BACKGROUND

Mobile communication devices may use Universal Integrated Circuit Cards (UICCs), also referred to as subscriber identity modules (SIMs), to authenticate themselves to a wireless carrier network operated by a mobile network operator (MNO) in order to receive communication services from the wireless carrier network. A UICC may be an integrated circuit chip that stores information that uniquely identifies the UICC, as well as information for accessing the wireless carrier network. Such information may include an integrated circuit card identifier (ICCID), an international mobile subscriber identity (IMSI) number, security authentication information, a MNO profile that enables the UICC to authenticate with the wireless carrier network, as well as other information.

A conventional UICC or SIM is specific to one carrier network and is hardwired to hold only the operator profile of the carrier network. For a mobile device using a conventional UICC to access a different carrier network, the user of the mobile device has to physically swap out the UICC for another UICC in order to access that different carrier network.

Embedded Universal Integrated Circuit Card (eUICC), also referred to as embedded subscriber identification module (eSIM) is fast becoming an industry standard. Unlike a conventional UICC or SIM, an eSIM or eUICC is an embedded SIM chip. Since an eSIM cannot be removed and the FTC considers locking an eSIM to only one carrier (MNO) to be an antitrust violation, an eSIM is required to accommodate multiple MNO profiles, including those for accessing different carrier networks and for different users. Consequently, an eSIM or eUICC can download new MNO profiles and remove MNO profiles that are no longer needed. Each MNO profile is downloaded from a subscription manager (SM), which generates or prepares MNO profiles and securely delivers the MNO profiles to subscribing mobile devices.

Similar to a UICC, Each eUICC or eSIM may store information that uniquely identifies the eUICC. Individual MNO profiles hold the information for accessing corresponding wireless carrier networks. The information provided by an MNO profile may include an integrated circuit card identifier (ICCID), an international mobile subscriber identity (IMSI) number, security authentication information that enables the eUICC to authenticate with the MNO's wireless carrier network, as well as other information.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to systems and techniques for monitoring interactions between an embedded subscriber identity module (eSIM, also referred to as embedded universal integrated circuit Card or eUICC) and a subscription manager (SM) regarding operations of MNO profiles. These profiles are defined on the subscription manager of the eUICC manufacturers and installed on the eUICC through a sequence of synchronous and/or asynchronous interactions between the eUICC of the mobile device and the subscription manager. In most cases, the service provider or the Subscription manager does not have complete visibility into the end-to-end performance of the MNO profile life cycle. This disclosure puts forth a system and method of monitoring the performance of these interactions in an automated manner.

Some embodiments of the disclosure provides a monitoring system that provides visibility into the end-to-end performance of a MNO profile in the eSIM of a mobile device by controlling a mobile device that is provisioned with a MNO profile and by communicating with the subscription manager that produces and delivers the MNO profile. The eSIM monitoring system enables the monitoring of the interactions between the subscription manager and the eSIM as well as the verification of the data preparation (SM-DP) and the secure routing (SM-SR) functionalities of the subscription manager. A mobile operator may use the monitoring system to monitor the end-to-end performance of the SM-DP+ and its interaction with the network and the mobile device.

Figure 1:
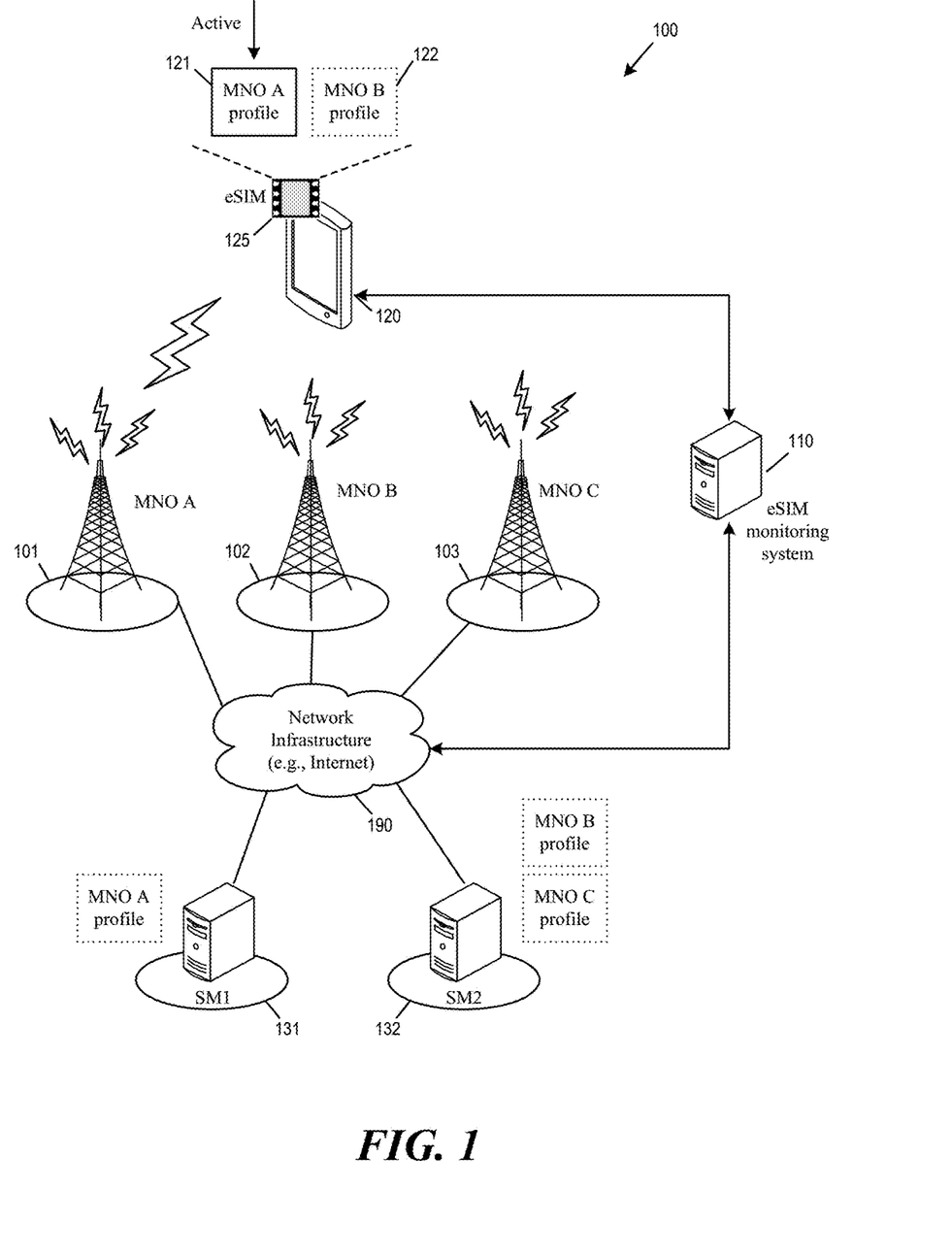
FIG. 1 illustrates an example network architecture of a wireless carrier system in which mobile devices with eSIMs receive MNO profiles from subscription managers and use the received MNO profiles to access wireless carrier networks.

FIG. 1 illustrates an example network architecture of wireless carrier system 100 in which mobile devices with eSIMs receive MNO profiles from subscription managers and use the received MNO profiles to access wireless carrier networks. The figure also illustrates an eSIM monitoring system 110 that provides visibility into operations related to a MNO profile by controlling a mobile device and communicating with the SM that produces and delivers the MNO profile.

As illustrated, the wireless carrier system 100 includes several wireless carrier networks that are provided by different mobile network operators MNO A 101, MNO B 102, and MNO C 103. A mobile device 120 is equipped with an eSIM 125, which has received an operator profile 121 for accessing MNO A and an operator profile 122 for accessing MNO B. The MNO profiles are provided by subscription managers (SMs) 131 and 132, which are servers that generate MNO profiles for accessing the carrier networks provided by the different MNOs 101-103. A subscription manager may include one server device or multiple server devices. A subscription manager may be associated with one specific MNO and performs subscription management operations (e.g., SM-SR and/or SM-DP) for that specific MNO. A subscription manager may also be associated with multiple different MNOs and perform subscription management operations for different MNOs. In the example, the SM 131 is associated with MNO A and is configured to generate and deliver operator profiles for MNO A; the SM 132 is associated with MNO B and MNO C and is configured to generate and deliver operator profiles for MNO B and MNO C. The MNO A profile 121 is currently active in the eSIM 125, allowing the mobile device 120 to access the carrier network of MNO A 101. The MNO B profile 122 is not activated in the mobile device 120 so the mobile device 120 cannot access the carrier network of MNO B 102.

The eSIM monitoring system 110 is configured to communicate with the mobile device 120 and the subscription managers 131 and 132. The mobile device 110 is accessible to the monitoring system 110 by a local wired or wireless connection (such as USB or Bluetooth). The subscription managers 131 and 132 are accessible to the eSIM monitoring system 11 through a network infrastructure 190 (such as the Internet). The network infrastructure 190 also provides the data pathway to the carrier networks operated by the MNOs 101-103 through which the subscription managers 131-132 deliver MNO profiles to the mobile devices (including the mobile device 120).

The eSIM monitoring system 110 may cause a SM to generate an MNO profile and to establish a secure channel to deliver the generated MNO profile to the mobile device 120. The monitoring system 110 controls the operations of the mobile device 120 in order to initiate various actions from mobile device. By communicating with the mobile phone and the subscription managers, the monitoring system 110 is able to initiate the creation of the MNO profile, monitoring the MNO profile's delivery from the a subscription manager (SM 131 or 132 depending on the MNO) to the mobile phone 110, as well as controlling and monitoring other actions taken regarding the MNO profile throughout the profile's life cycle. The monitoring system 100 collects data from the mobile device 120 and the subscription manager and presents the collected data.

Example User Device Components

Figure 2:
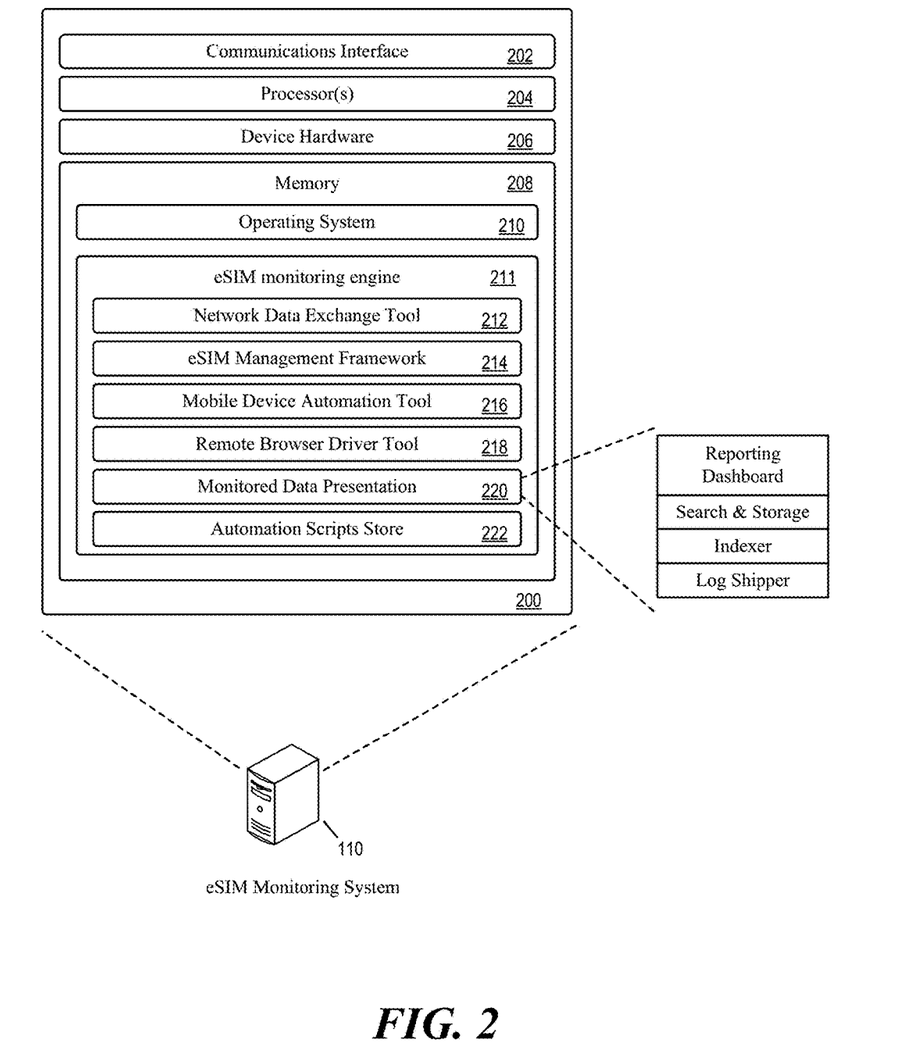
FIG. 2 is a block diagram showing various components of the eSIM monitoring system, consistent with an exemplary embodiment.

FIG. 2 is a block diagram showing various components of the eSIM monitoring system 110, consistent with an exemplary embodiment. In some embodiments, the eSIM monitoring system 110 is implemented by one computing device 200. The computing device 200 may be a general purpose computer, such as a desktop computer, tablet computer, laptop computer, server, or other electronic devices that are capable of receive inputs, process the inputs, and generate output data. In some embodiments, the computing device 200 is a single board computer (SBC). In some embodiments, the computing devices 200 may be virtual computing devices in the form of virtual machines or software containers that are hosted in a cloud.

The computing device 200 may be equipped with a communication interface 202, one or more processors 204, device hardware 206, and memory 208. The communication interface 202 may include wireless and/or wired communication components that enable the computing devices to transmit data to and receive data from other devices, whether through a dedicated wired connection or via a communications network. The device hardware 208 may include additional hardware that performs user interface, data display, data communication, data storage, and/or other server functions.

The memory 208 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 208 of the computing devices 200 may implement an operating system 210 and an eSIM monitoring engine 211. The operating system 210 may include components that enable the computing devices 200 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The eSIM monitoring engine 211 may include a network data exchange tool 212, eSIM management framework 214, mobile device 216, remote browser driver tool 218, a monitored data presentation module 220, and an automation scripts store 222. These modules may include routines, program instructions, objects, and/or data structures that perform particular tasks or implement particular abstract data types.

The network data exchange tool 212 is an application for exchanging data and media with a remote server over a network, such as by performing hypertext transfer protocol (HTTP). In some embodiments, the network data exchange tool is an application such as OKHTTP (an open source project designed to be an efficient HTTP client) that allows the computing device 200 to be a HTTP client when sending and receiving data with a remote server (such as a subscription manager).

The eSIM management framework 212 can be invoked in order to communicate with a subscription manager. The eSIM management framework 212 provides the component routines necessary for communicating and/or controlling the operations of the subscription manager in the form of an application program interface (API). In some embodiments, these APIs includes synchronous and/or asynchronous APIs for installing a MNO profile on a eUICC of a mobile device according to GSMA specification.

The mobile device automation tool 216 is an application capable of controlling a mobile device, for example, by sending commands to a client program running in the mobile device to launch applications or to change settings in the mobile device. In some embodiments, the mobile device automation tool receives connections from a client, listens for commands, executes those commands on a mobile device, and responds with an HTTP response representing the result of the command execution. An example of the mobile device automation tool 216 is Appium, which is an open source test automation tool for mobile applications. The mobile device automation tool allows the testing of different types of mobile applications, including native, hybrid and mobile web. It also allows automated tests on actual devices, emulators and simulators.

The remote browser driver tool 218 is an application that enables the computing device 200 to remotely control a browser in a mobile device. In some embodiments, the remote browser driver tool includes a collection of language specific bindings to drive the browser. An example of such remote browser driver tool is Selenium WebDriver, which is an open source tool that provides APIs for automating web application testing.

The monitored data presentation module 220 performs post processing and other presentation related tasks on data collected from the mobile device and the subscription manager. The monitored data presentation module 220 may send logs of data collected from the mobile device and subscription manager to another device for analysis and presentation. The presentation module 220 may provide indexing to the data logs, ship the indexed data logs for storage or presentation by a dashboard.

The automation scripts storage 222 stores scripts or codes for the mobile device automation tool 216, the remote browser driver tool 218, and/or the network data exchange tool 212. The scripts or codes control the sequence of automation steps in the subscription manager and/or the mobile device in order to launch specific operations and/or to gain visibility into specific functionalities in the subscription manager and/or the mobile device. These may include scripts for Appium to control apps in the mobile device, scripts for Selenium to drive browser operations in the mobile device, and/or scripts for OKHTTP that invoke eSIM management framework API in order to gain access to a subscription manager. These scripts are loaded onto the computing devices 200 and can be scheduled to be executed with a defined periodicity.

Figure 3:
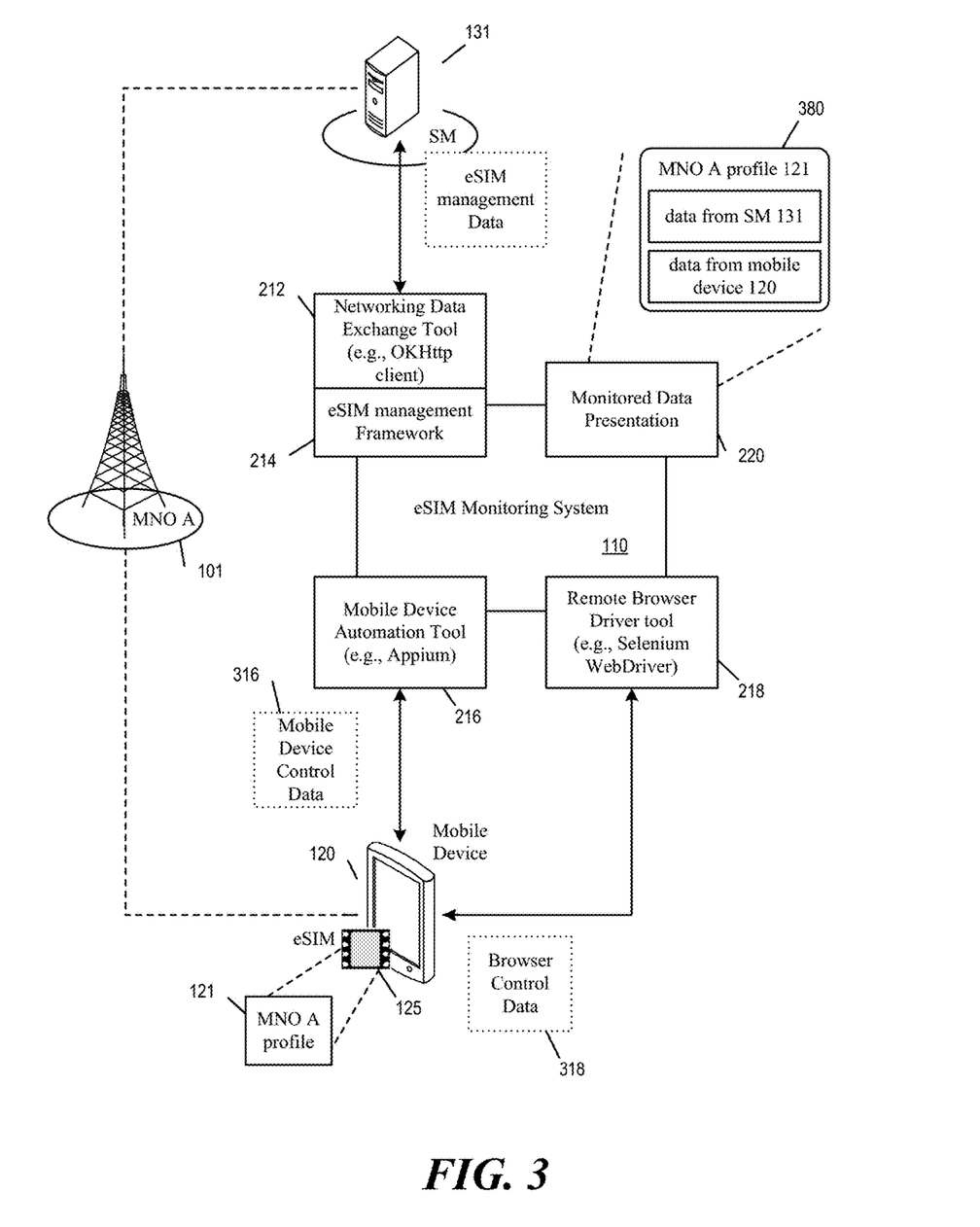
FIG. 3 illustrates the communication and control of the subscription managers and the mobile device by the eSIM monitoring system.

FIG. 3 illustrates the communication and control of the subscription managers and the mobile device by the eSIM monitoring system 110. As illustrated, the eSIM monitoring system 110 is communicating with the subscription manager 131 and the mobile device 110. The system 110 communicates with the subscription manager 131 by executing the network data exchange tool 212, and communicates with the mobile device 120 by executing the mobile device automation tool 216 and the remote browser driver tool 218.

The mobile device automation tool 216 allows the eSIM monitoring system 110 to control the operations of the mobile device 120 by e.g., sending device control data 316 to the mobile device 120 to launch applications or to change settings. The remote browser driver tool 218 allows the eSIM monitoring system 110 to remotely control browsers in the mobile device 120 by e.g., sending browser control data 318 to interact with browser or graphical user interface (GUI) of the mobile device 120. Consequently, the eSIM monitoring system may control the mobile device 120 to access websites, manipulate (e.g., press or select) GUI items, populate data fields, or perform other control operations that a user may perform at the actual mobile device.

In addition to providing control data to the mobile device 120, the mobile device automation tool 216 and the remote browser driver tool 218 also have the capability of retrieving data from the mobile device 120, such as meta-data for location, device features, etc., as well as data generated by applications running in the mobile device or data presented by browsers. The eSIM monitoring system is therefore able to monitor the operations of the mobile device 120, including operations at the eSIM of the mobile device. The eSIM monitoring system is therefore able to obtain status information and/or operating state regarding a particular MNO profile (e.g., whether the MNO profile is active, disabled, in-transit, deleted, non-existent, etc.). In some embodiments, the eSIM monitoring system interact with the LPA clients on the devices to validate the profile actions such as Download, Install, Enable, Disable, Delete, etc.

The network data exchange tool 212 enables the exchange of data and media with the subscription manager 131 by performing HTTP. In some embodiments, the network data exchange tool is an application that configures the eSIM monitoring system to be a HTTP client (such as OKHTTP) when sending and receiving data with the subscription manager 131. In order to access the subscription manager 131, the eSIM monitoring system 110 invokes the API in the eSIM management framework. The use of the eSIM management framework allows the eSIM monitoring system to access specific resources in the subscription manager 131, or to request specified services or actions in the subscription manager 131, actions such as instructing the subscription manager 131 to prepare/generate a MNO profile for a specified mobile device (e.g., the mobile device 120) in order to access a specified carrier network (e.g., the carrier network of MNO A), or to securely route/deliver the prepared MNO profile to the specified mobile device. The eSIM monitoring system 110 uses the eSIM management framework 214 to address and access specific resources in the subscription manager 131 and to obtain status information. The obtained status information may include data regarding whether the SM has received a request for MNO profile and whether a MNO profile has been successfully delivered to the target mobile device.

The data produced by the monitoring of the mobile device 120 and the subscription manager 131 are collected and provided to the monitored data presentation module 220 for post processing and presentation. In some embodiments, the presentation module 220 perform the post processing tasks (e.g., indexing, storage, dashboard presentation) locally at the computing device 200. In some embodiments, the collected data are provided to other computing devices that conduct their own post processing and presentation. In some embodiments, the monitored data presentation module 220 at the computing device 200 perform some of the post processing before shipping the post processed data to other computing devices.

In some embodiments, the eSIM monitoring system 110 identifies data belonging to a particular MNO profile from the mobile device and the subscription manager and present the data in one presentation, e.g., in one data structure, in one GUI item, in one visual element, in the same display, in the same table, in the same window, in the same report, in the same reporting dashboard, etc. Such a presentation may include an analysis derived from data belonging to a particular MNO profile collected from both the mobile device and the subscription manager, including system performance metrics and alarm for system errors. As illustrated, the data collected from the SM 131 and from the mobile device 120 regarding the MNO A profile 121 are post-processed and made into one presentation 380 by the eSIM monitoring system 110 (at the presentation module 220).

In some embodiments, the provisioning, including generation and delivery, of MNO profiles is conducted according to a standard promulgated by industry groups such as Global System for Mobile Communications Association (GSMA). This allows mobile devices to freely change carrier networks by downloading and activating MNO profiles of different carrier networks. This also allows a subscription manager (SM) to securely route a MNO profile of one MNO to its target mobile device through the carrier network of another MNO. In the case of GSMA, the standard specifies message protocols for interfaces between the subscription manager (including SM-SR and SM-DP) and the eUICC of a mobile device. The eSIM monitoring system 110 may monitor the life cycle of a MNO profile in the subscription manager and in the eUICC at the various interfaces between the subscription manager and the eUICC. The eSIM monitoring system 110 may also inject control data through these interfaces into the operations of the subscription manager as well as of the eUICC.

Figure 4:
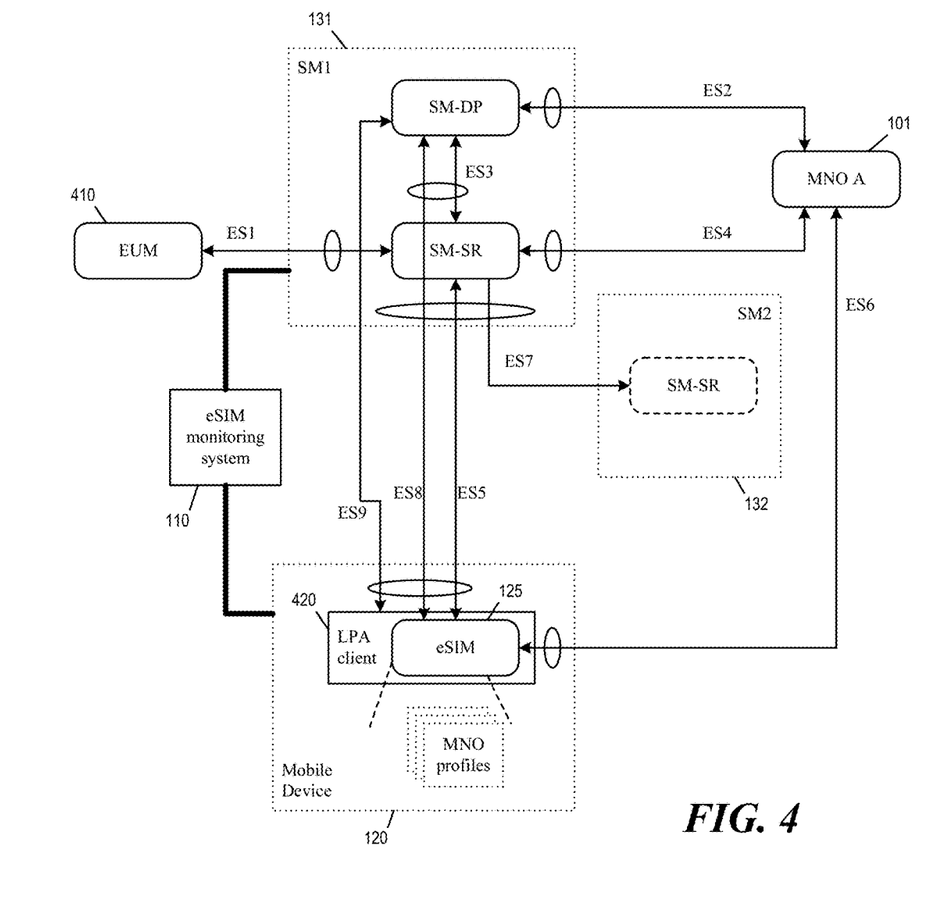
FIG. 4 illustrates various Global System for Mobile Communications Association (GSMA) interfaces of a eUICC and a subscription manager.

FIG. 4 illustrates various GSMA interfaces of a eUICC and a subscription manager (the SM 131). The figure conceptually illustrates communication interfaces among a SM-DP (data preparation function) of the SM 131, a SM-SR (secure routing function) of the SM 131, the eUICC of the mobile device 120, the manufacture of the eUICC (EUM 410), and the MNO A 131 for which the profile generated. These interfaces represent secure communication connections over wired and wireless communications mediums of wireless carrier networks of different MNOs (e.g., of MNOs A, B, and/or C) as well as network infrastructure (e.g., Internet 190) of the network architecture 100 of FIG. 1.

According to GSMA, these interfaces include: ES1 (between the SM-SR and the EUM), ES2 (between the SM-DP and the MNO), ES3 (between the SM-SR and the SM-DP), ES4 (between the SM-SR and the MNO), ES5 (between the SM-SR and the eUICC 125), ES6 (between the MNO and the eUICC), ES7 (between the SM-SR and a SM-SR of another MNO or of another SM 132), ES8 (between the SM-DP and the eUICC 125), and ES9 (between SM-DP and a LPA client 420).

The mobile device 120 is operating the local profile assistant (LPA) client 420. This software provides LPA services, such as Profile download or Profile management, to the eUICC. The LPA assists in the download of the MNO profile between SM-DP+ and eUICC, as well as allowing for local profile management on the device by the end user.

In some embodiments, the automation scripts written for the mobile device automation tool 216, the remote browser driver tool 218, and the network data exchange tool 212 include instructions that generate requests towards the various interfaces defined by GSMA and control operations in both the mobile device and the SM. The automation scripts may also include instructions that monitor traffic and collect data at the various interfaces defined by GSMA. The scripts may also drive tests so the eSIM monitoring system may collect metrics from the mobile device and/or the subscription manager and publish collected metrics to a reporting queue for post process and presentation.

For example, the eSIM monitoring system may use ES2 to instruct SM-DP to prepare a new MNO profile, use ES4 to instruct SM-SR to route the prepared MNO profile to a target mobile device (e.g., 120) and use ES5, ES6, and/or ES8 to instruct the mobile device to download the new MNO profile, and monitors ES5, ES6, and/or ES8 at the mobile device to confirm whether the MNO profile is successfully delivered.

As another example, the eSIM monitoring system 110 may use the mobile device automation tool 216 and the remote browser driver tool 218 to control the mobile device 120 to cause it to generate a request for a new operator profile for a particular MNO. The eSIM monitoring system 110 then invokes its eSIM management framework to access the SM that is responsible for generating the operator profiles for the particular MNO. The eSIM monitoring system may use ES2 and ES4 to actively instruct SM-DP and SM-SR to generate and deliver the MNO profile. The eSIM monitoring system 110 may also let the SM perform SM-DP and SM-SR operations on its own while using interfaces ES2, ES4, ES5, ES7 and/or ES8 to monitor the generation and delivery of the MNO profile.

The eSIM monitoring system may also use the GSMA interfaces to perform other operations with regard to a MNO profile, such as controlling the browsers of the mobile device to activate, disable, or delete a MNO profile. The eSIM monitoring system may observe data traffic at interfaces such as ES2, ES4 (at the SM), and/or ES6 (at the mobile device) to obtain status data for confirming that the actions taken with regard to the MNO profile has been successfully performed.

Example Processes

Figure 5:
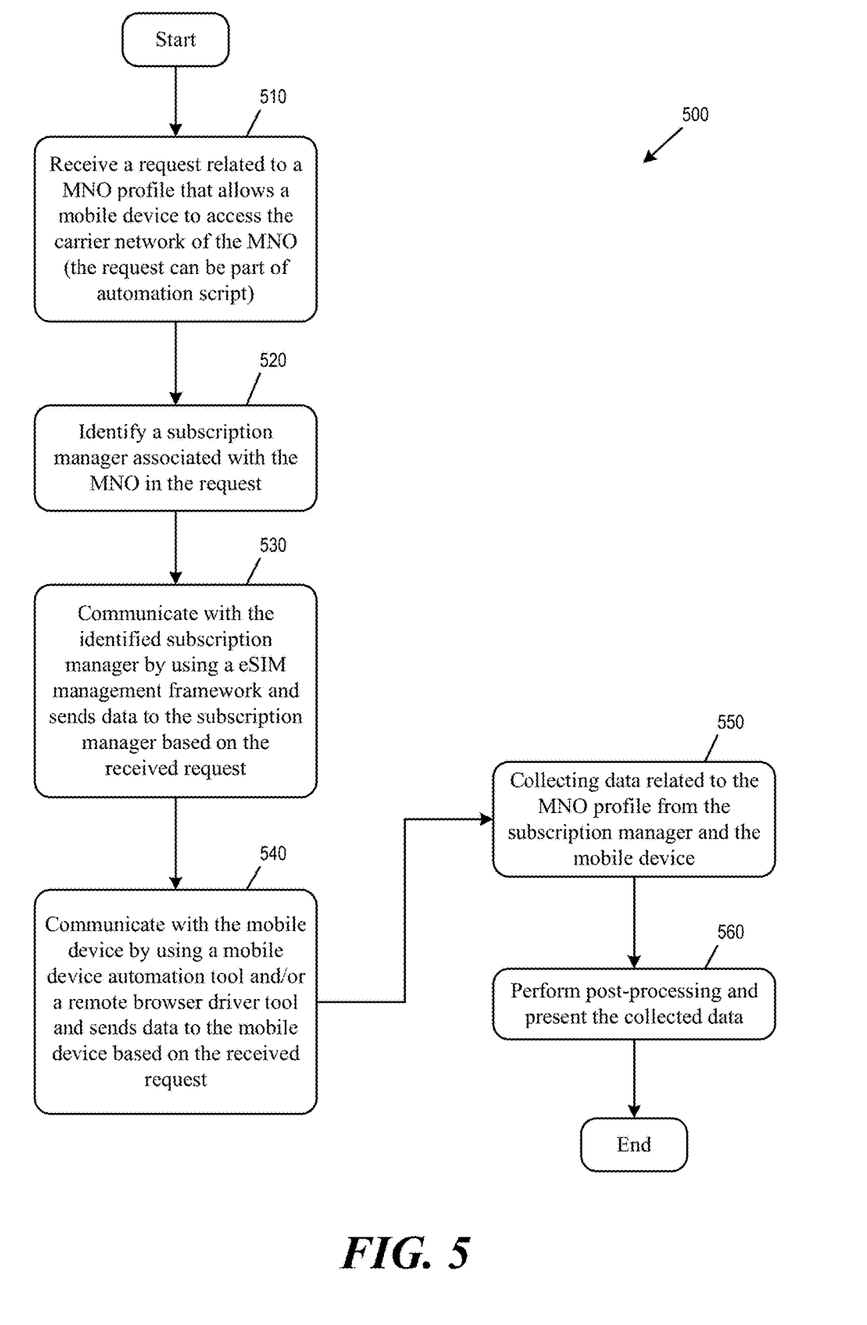
FIG. 5 is a flow diagram of an example process for monitoring the life cycle of a MNO profile that is created by a subscription manager and delivered to the eSIM of a mobile device for enabling the mobile device to access the carrier network operated by the MNO.
Figure 6:
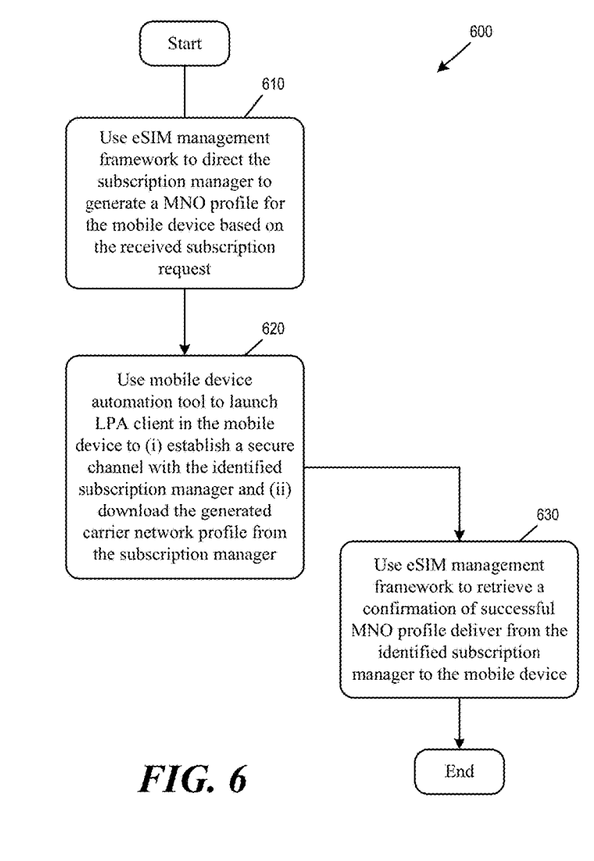
FIG. 6 is a flow diagram of an example process for creating and downloading a MNO profile by initiating the creation of the MNO profile at a subscription manager.
Figure 7:
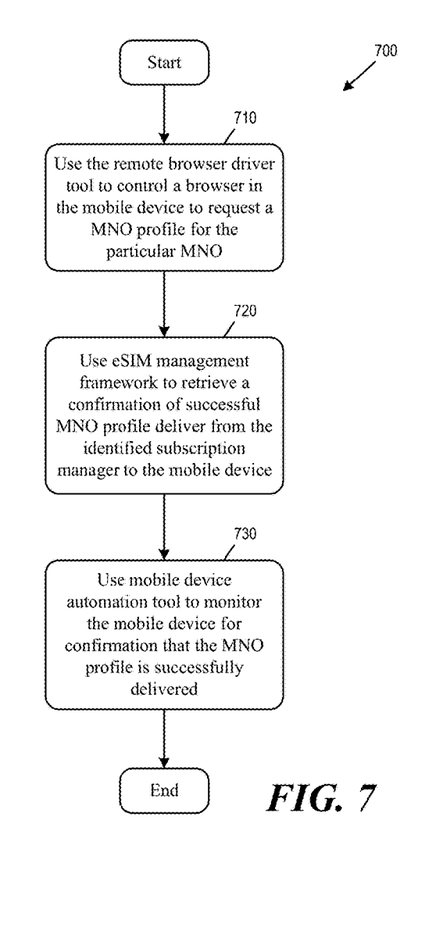
FIG. 7 is a flow diagram of an example process for creating and downloading a MNO profile by initiating the creation of the MNO profile from a mobile device.

FIGS. 5-7 conceptually illustrates processes 500-$-0700 for monitoring the life cycle of a MNO profile, from its creation at a subscription manager to its download, activation, deactivation, and/or deletion at the eSIM of a mobile device. The processes may be performed by the eSIM monitoring system 110, which is directly connected with a mobile device (e.g., the mobile device 120 of FIG. 1) and has network access that lead to one or more subscription managers (e.g., the subscription managers 131-132 of FIG. 1).

Each of the processes 500-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process. For discussion purposes, the processes 500-700 are described with reference to the network architecture 100 of FIG. 1 as well as the architecture of the eSIM monitoring system 110.

FIG. 5 is a flow diagram of an example process 500 for monitoring the life cycle of a MNO profile that is created by a subscription manager and delivered to the eSIM of a mobile device for enabling the mobile device to access the carrier network operated by the MNO.

At block 510, the eSIM monitoring system receives a request related to a MNO profile that allows a mobile device to access the carrier network of the MNO. This request may be part of the automation scripts or codes written for the mobile device automation tool 216, the remote browser driver tool 218, or the network data exchange tool 212. The mobile device may have zero, one, or multiple MNO profiles already provisioned in its eSIM.

At block 520, the eSIM monitoring system identifies a subscription manager associated with the MNO in the request. Different MNOs may use different subscription managers to manage (e.g., generate and deliver) their operator profiles. Different MNOs may also use a same subscription manager to manager their operator profiles. The eSIM monitoring system therefore may identify or select a subscription manager that is associated with the MNO related to the request.

At block 530, the eSIM monitoring system communicates with the identified subscription manager by using the eSIM management framework 214 and sends data to the subscription manager based on the received request. The data may include signals for GSMA interfaces for SM-SR and/or SM-DP, for example as ES1, ES2, ES3, ES4, ES5, ES7, and ES8. The eSIM monitoring system may use the network data exchange tool 212 to communicate with the subscription manager through the network by performing HTTP exchanges. Such communication may include commands to the subscription manager to generate the MNO profile for the mobile device, to activate or de-activate the MNO profile, etc.

At block 540, the eSIM monitoring system communicates with the directly connected mobile device by using the mobile device automation tool 216 and/or the remote browser driver tool 218 and sends data to the mobile device based on the received request. The received request may include automation scripts for the remote browser driver tool (such as Selenium), which controls the browser in the mobile device to perform tasks specified according to the request. The request may also include automation scripts for the mobile device automation tool (such as Appium), which commands the eSIM monitoring system to send data to GSMA interfaces in the mobile device such as ES5, ES6, and ES8. Such request may include request for a MNO profile to be generated by the subscription manager and delivered to the mobile device. The eSIM monitoring system may also use the mobile device automation tool 216 and/or the remote browser driver tool 218 to change the operating state of a MNO profile in the eSIM, such as to enable, delete, disable, etc., or to switch from using a first MNO profile for accessing a first carrier network to using a second MNO profile for accessing a second, different carrier network.

At block 550, the eSIM monitoring system collects data related to the MNO profile from the subscription manager and from the directly connected mobile device. In some embodiments, the communication with the mobile device and the subscription manager at blocks 530 and 540 also allows the eSIM monitoring system to collect data. For example, the eSIM monitoring system may use the eSIM management framework 214 and the network data exchange tool 212 to monitor the GSMA interfaces at the subscription manager and collect data from the monitored interfaces. Likewise, the eSIM monitoring system may use mobile device automation tool 216 and the remote browser driver tool 218 to monitor the GSMA interfaces at the eUICC and collect data from the monitored interfaces. In addition, the eSIM monitoring system may use mobile device automation tool 216 and the remote browser driver tool 218 to manipulate the mobile device into providing visibility into data storage or intermediate data produced by mobile applications.

At block 560, the eSIM monitoring system performs post processing on the collected data and present the collected data. The eSIM monitoring system (e.g., by using the monitored data presentation module 220) may send logs of data collected from the mobile device and the subscription manager to another device for analysis and presentation. The eSIM monitoring system may provide indexing to the data logs and ship the indexed data logs for storage or for presentation by a reporting dashboard under a particular framework. The eSIM monitoring system may also provide the collected data to other computing devices to conduct their own post processing and presentation. In some embodiments, the eSIM monitoring system 110 identifies data related to a particular MNO profile from the mobile device and the subscription manager and present the identified data in one presentation.

FIG. 6 is a flow diagram of an example process 600 for creating and downloading a MNO profile by initiating the creation of the MNO profile at a subscription manager. The eSIM monitoring system may perform the process 600 when it performs blocks 530 and 540.

At block 610, based on the received subscription request, the eSIM monitoring system uses the eSIM management framework to direct the identified subscription manager to generate an MNO profile for the requested carrier network for the mobile device.

At block 620, the eSIM monitoring system uses the mobile device automation tool to launch an LPA client in the mobile device to (i) establish a secure channel with the identified subscription manager and (ii) download the generated carrier network profile from the identified subscription manager.

At block 630, the eSIM monitoring system uses the eSIM management framework to retrieve a confirmation of a successful MNO profile delivery from the identified subscription manager.

FIG. 7 is a flow diagram of an example process 700 for creating and downloading a MNO profile by initiating the creation of the MNO profile from a mobile device. The eSIM monitoring system may perform the process 700 when it performs blocks 530 and 540.

At block 710, the eSIM monitoring system uses the remote browser driver tool to control a browser in the mobile device to request a MNO profile for the particular MNO. The eSIM monitoring system then waits while the mobile device to establish a secure channel with the subscription manager associated with the MNO.

At block 720, the eSIM monitoring system uses the eSIM management framework to retrieve a confirmation of the creation and delivery of the MNO profile from the subscription manager to the mobile device.

At block 730, the eSIM monitoring system uses the mobile device automation tool to monitor the mobile device (by e.g., monitoring the GSMA interfaces) for confirmation that the MNO profile is successfully delivered. Though not illustrated, the eSIM monitoring system may also use the mobile device automation tool to perform other actions with regard to the delivered MNO profile in the mobile device, such activation, deactivation, or deletion.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a computing device storing computer-executable instructions that upon execution cause one or more processors to perform acts comprising:

receiving, at a monitoring device, a request related to a mobile network operator (MNO) profile that allows a mobile device operating the MNO profile to access a carrier network of an MNO;

identifying, at the monitoring device, a subscription manager associated with the MNO in the request from a plurality of subscription managers;

communicating, at the monitoring device, with the identified subscription manager through a network;

communicating, at the monitoring device, with the mobile device;

collecting, by the monitoring device, data related to the MNO profile from the identified subscription manager and from the mobile device operating the MNO profile; and presenting the collected data related to the MNO profile from the mobile device and from the identified subscription manager in one presentation at the monitoring device.

2. The one or more non-transitory computer-readable media of claim 1, wherein the MNO profile is a first operator profile provisioned in an embedded subscriber identity module (eSIM) of the mobile device and the carrier network is a first carrier network, the eSIM of the mobile device is further provisioned with a second operator profile for accessing a second carrier network that is different than the first carrier network.

3. The one or more non-transitory computer-readable media of claim 2, wherein communicating with the mobile device comprises controlling, from the monitoring device, a browser in the mobile device to switch from using the first operator profile to using the second operator profile.

4. The one or more non-transitory computer-readable media of claim 1, wherein communicating with the subscription manager comprises directing the subscription manager to generate the MNO profile, wherein communicating with the mobile device comprises launching an application to download the generated MNO profile from the subscription manager.

5. The one or more non-transitory computer-readable media of claim 4, wherein the communicating with the mobile device further comprises identifying an operating state of the MNO profile in the mobile device.

6. The one or more non-transitory computer-readable media of claim 4, wherein communicating with the subscription manager further comprises retrieving a delivery status of the download of the generated MNO profile.

7. The one or more non-transitory computer-readable media of claim 1, wherein collecting data from the mobile device comprises monitoring a set of interfaces between an embedded subscriber identity module (eSIM) of the mobile device and the subscription manager.

8. The one or more non-transitory computer-readable media of claim 1, wherein communicating with the subscription manager comprises invoking, at the monitoring device, an application program interface (API) for managing the subscription manager.

9. The one or more non-transitory computer-readable media of claim 1, wherein communicating with the subscription manager comprises using a network data exchange tool to communicate with the subscription manager through the network.

10. The one or more non-transitory computer-readable media of claim 1, wherein the communicating with the mobile device comprises using a mobile device automation tool to control one or more applications running in the mobile device.

11. The one or more non-transitory computer-readable media of claim 10, wherein the one or more applications comprise a local profile assistant (LPA) client that establishes a secure channel with the subscription manager.

12. The one or more non-transitory computer-readable media of claim 1, wherein communicating with the mobile device further comprises using a remote browser control tool to control a browser operating in the mobile device.

13. A computer-implemented method, comprising:

communicating, at a monitoring device, with a mobile device having an embedded subscriber identification module (eSIM) to request an operator profile for accessing a carrier network;

identifying, at the monitoring device, a subscription manager associated with a mobile network operator (MNO) of the carrier network from a plurality of subscription managers;

communicating, at the monitoring device, with the identified subscription manager through a network;

collecting, by the monitoring device, data regarding generation and delivery of the operator profile from the mobile device and the subscription manager; and presenting the collected data regarding generation and delivery of the operator profile from the mobile device and from the subscription manager in one presentation.

14. The computer-implemented method of claim 13, wherein collecting data from the mobile device comprises monitoring a set of interfaces between the eSIM of the mobile device and the subscription manager.

15. The computer-implemented method of claim 13, wherein communicating with the subscription manager comprises invoking an application program interface (API) at the computing device for managing the subscription manager.

16. The computer-implemented method of claim 13, wherein communicating with the subscription manager comprises using a network data exchange tool to communicate with the subscription manager through the network.

17. The computer-implemented method of claim 13, wherein the communicating with the mobile device comprises using a mobile device automation tool to control one or more applications running in the mobile device, wherein the one or more applications comprise a local profile assistant (LPA) client that establishes a secure channel with the subscription manager.

18. The computer-implemented method of claim 13, wherein communicating with the mobile device further comprises using a remote browser control tool to control a browser operating in the mobile device.

19. The computer-implemented method of claim 13, wherein the operator profile is a first operator profile provisioned in the eSIM of the mobile device and the carrier network is a first carrier network, the eSIM of the mobile device is further provisioned with a second operator profile for accessing a second carrier network that is different than the first carrier network.

* * * * *